June 26, 1962     A. J. HILD     3,041,064
PIPE SUPPORT
Filed Sept. 3, 1959
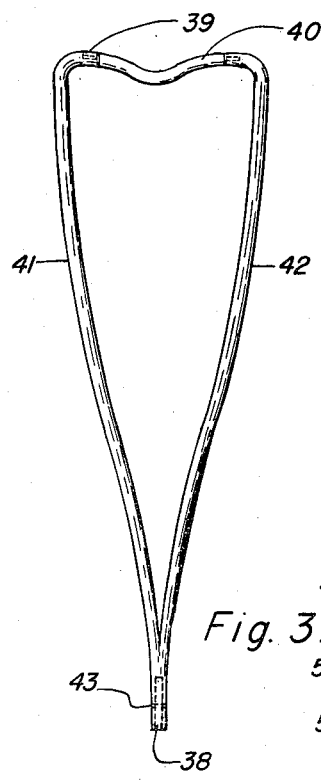
Fig. 1.
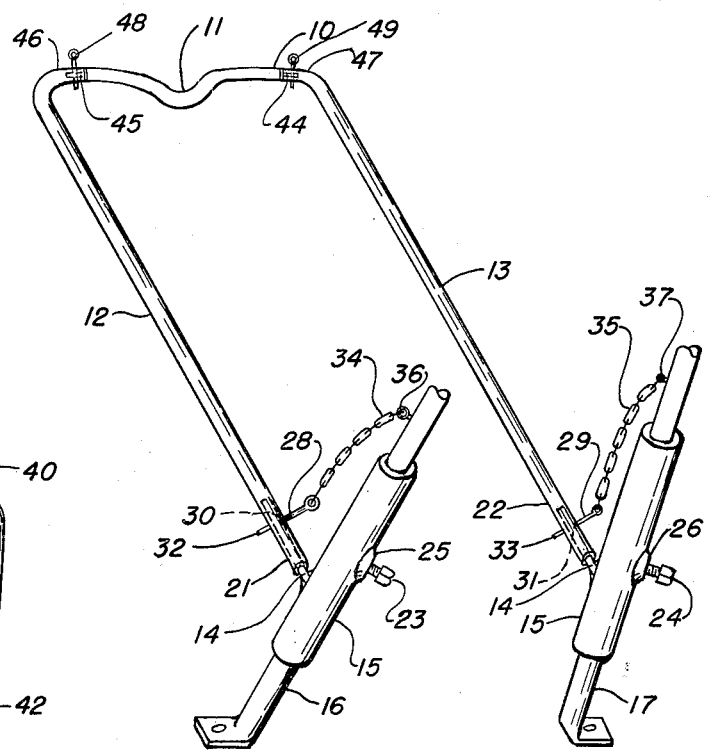
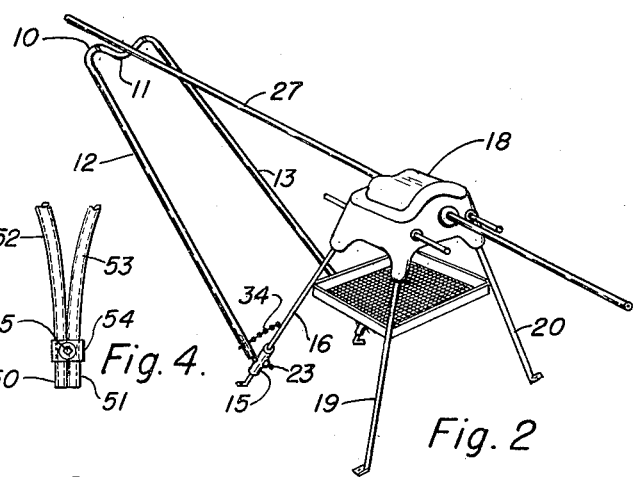
Fig. 3.
Fig. 4.
Fig. 2
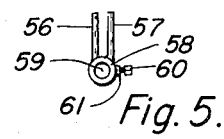
Fig. 5.
INVENTOR.
ARTHUR J. HILD
BY
Victor J. Evans & Co.
ATTORNEYS United States Patent Office 3,041,064
Patented June 26, 1962

3,041,064
PIPE SUPPORT
Arthur J. Hild, 7800 NW. 5th Ave., Miami 50, Fla.
Filed Sept. 3, 1959, Ser. No. 837,969
2 Claims. (Cl. 269—76)

This invention relates to pipe threading and cutting tools and machines, particularly of the portable type, and in particular a U-shaped frame of tubular stock mounted with the ends positioned over pins extended from sleeves on the rear legs of a portable power drive or stand whereby pipe being cut or threaded in the stand is supported at a point remotely situated from the stand.

The purpose of this invention is to provide a support formed to be rigidly mounted on a pipe stand or portable power drive whereby a relatively long piece of pipe, being cut or threaded, is supported substantially in alignment with the cutting or threading dies.

Various types of supports, particularly in the form of cross braces and other brackets or rods have been provided for supporting an extended end of a piece of pipe. However, such devices are supported independent of the pipe or vise stand and in threading pipe it is difficult to maintain the stand in alignment with the supporting elements. With this thought in mind this invention contemplates a pipe supporting element mounted on and extended from legs of a conventional portable power drive or pipe threading or cutting vise or stand whereby the supporting element retains the pipe in alignment with cutting or threading dies of the tool.

The object of this invention is, therefore, to provide a pipe supporting element that is designed to be mounted on a pipe threading tool.

Another object of the invention is to provide a pipe support having a pipe receiving socket carried by upwardly inclined arms whereby with the arms carried by sleeves slidably mounted on legs of a pipe threading tool the socket remains in alignment with cutting or threading elements of the tool.

Another important object of the invention is to provide a pipe support for a portable pipe threading or cutting tool in which the position of the support in relation to the tool is adjustable.

A further object of the invention is to provide a pipe support for retaining pipe in alignment with dies of a pipe stand in which the support is mounted on legs of the pipe stand and also in which the support is of a simple and economical construction.

With these and other objects and advantages in view the invention embodies a pair of sleeves having pins extended upwardly therefrom and having set screws threaded therein, and a U-shaped frame, of tubular stock, positioned with lower ends of arms thereof extended over the pins extended from the sleeves, and with upper ends of the arms secured to an insert having a pipe retaining socket therein.

Other features and advantages of the invention will appear from the following description taken in connection with the drawing, wherein:

FIGURE 1 is a view showing the improved pipe support mounted on pins extended from sleeves positioned on legs of a vise stand.

FIGURE 2 is a view, similar to that shown in FIGURE 1, with the parts shown on a smaller scale illustrating the relative position of the pipe support in relation to the dies of the tool.

FIGURE 3 is a view showing a modification wherein the pipe support is designed for use on a stand having three legs.

FIGURE 4 is a view showing a modification of the pipe support for a three leg power vise, wherein the two side tubes are secured together by welding and a clamp.

FIGURE 5 is a view showing two pins extended from a collar on the rear leg of a three leg power vise.

Referring now to the drawing wherein like reference characters denote corresponding parts the improved pipe support of this invention includes a cross bar 10 having a pipe receiving socket 11 therein with arms 12 and 13 at the sides providing an inverted U-shaped frame which is positioned on pins 14 extended from sleeves 15 that are slidably mounted on rear legs 16 and 17, respectively, of a portable power drive or stand 18 having front legs 19 and 20.

The lower ends 21 and 22 of the arms of the U-shaped frame, which are tubular in cross-section, are positioned over the pins 14 which are secured, such as by welding, to the sleeves 15 and by this means the arms 12 and 13 of the U-shaped frame or support are rigidly held in an upwardly inclined position.

The sleeves 15 are provided with set screws 23 and 24 that are threaded in bosses 25 and 26, respectively whereby the sleeves are readily adjustable on the legs of the stand so that the socket 11 may be aligned with the head of the tool 18.

With the parts assembled in this manner a pipe 27, extended through the head 18, is supported in substantially a horizontal position by the support.

The lower ends of the arms 12 and 13 are provided with transversely disposed openings 28 and 29 and the pins 14 are provided with registering openings 30 and 31 whereby pins 32 and 33, attached to the legs 16 and 17 by chains 34 and 35, may be positioned in the openings to prevent accidental separation of the U-shaped frame from the sleeves 15 or legs of the stand. The upper ends of the chains are secured in eyes 36 and 37 on the legs 16 and 17.

In some instances vise or vise threading stands of this type are provided with three legs, two at the front and one at the rear, and for such stands, one of the sleeves 15 may be positioned on the third or rear leg with one of the pins 14 extended upwardly and support, as illustrated in FIGURE 3, and having a tubular socket 38 at the lower end is positioned over the pin extended from the sleeve on the rear leg supporting a socket 39 in a crossbar 40, at the upper ends of arms 41 and 42, in alignment with the threading dies or other cutting elements of the tool. The tubular socket 38 is provided with an opening 43 for receiving a pin, such as one of the pins 32 or 33 whereby the frame may be supported with the cross-bar 40 normal to pipe extended through the head of the machine.

In threading pipe on a portable power drive or stand, such as the stand illustrated in FIGURE 2, the stand often twists and turns, making it difficult to support the extended end of the pipe on a support extended upwardly from the ground or from a floor. By attaching the U-shaped support to the legs or to a leg of the stand the support moves with the stand whereby the pipe remains in alignment with the cutting element continuously.

The cross-bar 11 of the U-shaped support is provided with pins 44 and 45 which extend from the ends and sections 46 and 47 of the arms 12 and 13 slide over the pins 44 and 45. These connections are provided with transversely disposed pins 48 and 49 that extend through the sections 46 and 47 and also through the pins 44 and 45.

The support for the stand having three legs may also be formed as illustrated in FIGURES 4 and 5 in which ends 50 and 51 of upwardly extended arms 52 and 53 are secured together, such as by welding and the ends are also retained in position by clamps 54 to which bolts 55, which also extend between the ends 50 and 51 extend. In this design the ends 50 and 51 of the support are positioned over pins 56 and 57 that extend upwardly from a collar 58 that is secured on a third leg 59 of a stand. The collar 58 is secured in position on the leg 59 by a set-screw 60 threaded in a boss 61 on the collar. With the lower end of the support formed in this manner twisting or turning of the support is prevented and the support is adjustably mounted on the third leg of a stand having three legs.

It will be understood that modifications, within the scope of the appended claims, may be made in the design and arrangement of the parts without departing from the spirit of the invention.

What is claimed is:

1. In a pipe support, the combination which comprises sleeves formed to be positioned on legs of a portable power drive or pipe stand, set screws threaded in the sleeves for retaining the sleeves in adjusted positions, said sleeves having upwardly inclined first pins extended therefrom, a U-shaped tubular frame having arms, a cross member connecting one of the ends of said arms, said frame being positioned with the ends of the arms opposite to the ends connected by the cross member extended over said first pins, second pins extended through the arms and said first pins, chains securing the said second pins to the legs of the portable power drive or pipe stand, and the cross member of said frame having a pipe receiving recess therein.

2. In a pipe support, the combination which comprises a sleeve formed to be positioned on a leg of a pipe stand, a set screw threaded in the sleeve for retaining the sleeve in adjusted position, an upwardly inclined first pin extended from the sleeve, a tubular frame positioned with one end extended over said first pin, a second pin extended through the tubular frame and said first pin for preventing accidental separation of the tubular frame from the sleeve and pipe stand, and a chain connecting said second pin to the leg of the pipe stand.

References Cited in the file of this patent
UNITED STATES PATENTS

| | | |
|---|---|---|
| 960,916 | Heiser | June 7, 1910 |
| 1,278,401 | Velde | Sept. 10, 1918 |
| 2,709,384 | Harris | May 31, 1955 |

FOREIGN PATENTS

| | | |
|---|---|---|
| 860,142 | Germany | Dec. 18, 1952 |